Aug. 27, 1946.　　　M. H. SWEET　　　2,406,716
DIRECT READING DENSITOMETER
Filed July 29, 1942　　　3 Sheets-Sheet 1
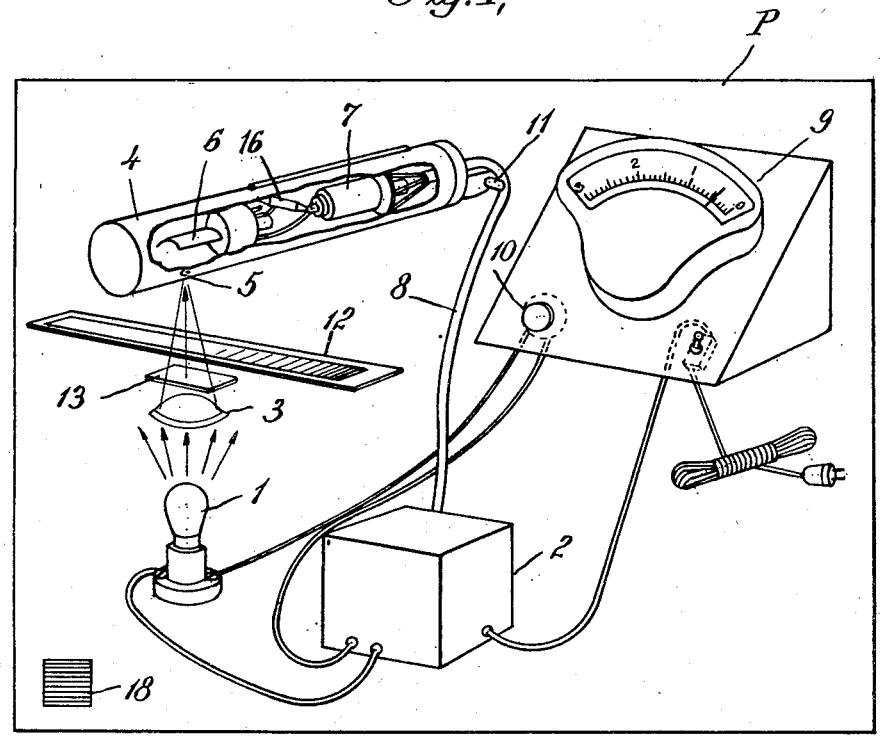
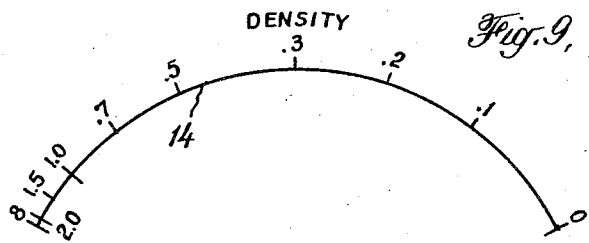
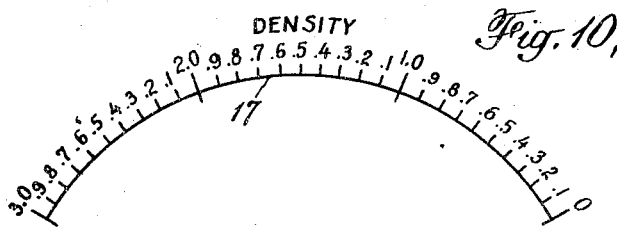
INVENTOR
MONROE H. SWEET
BY
ATTORNEY

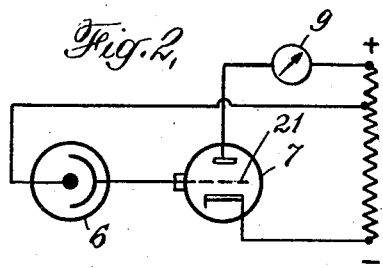
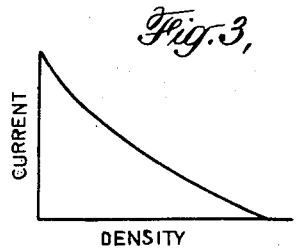
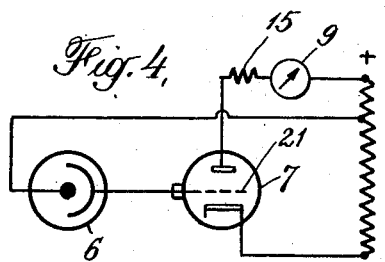
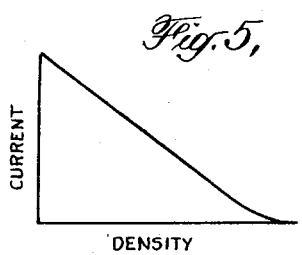
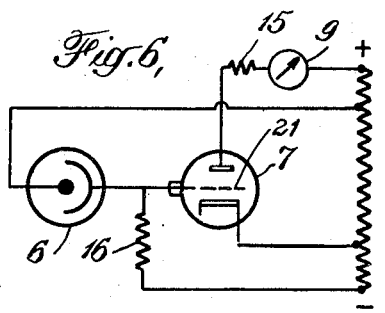
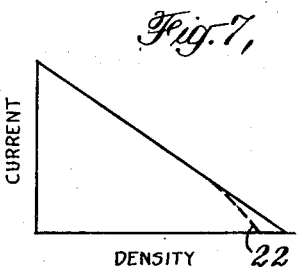

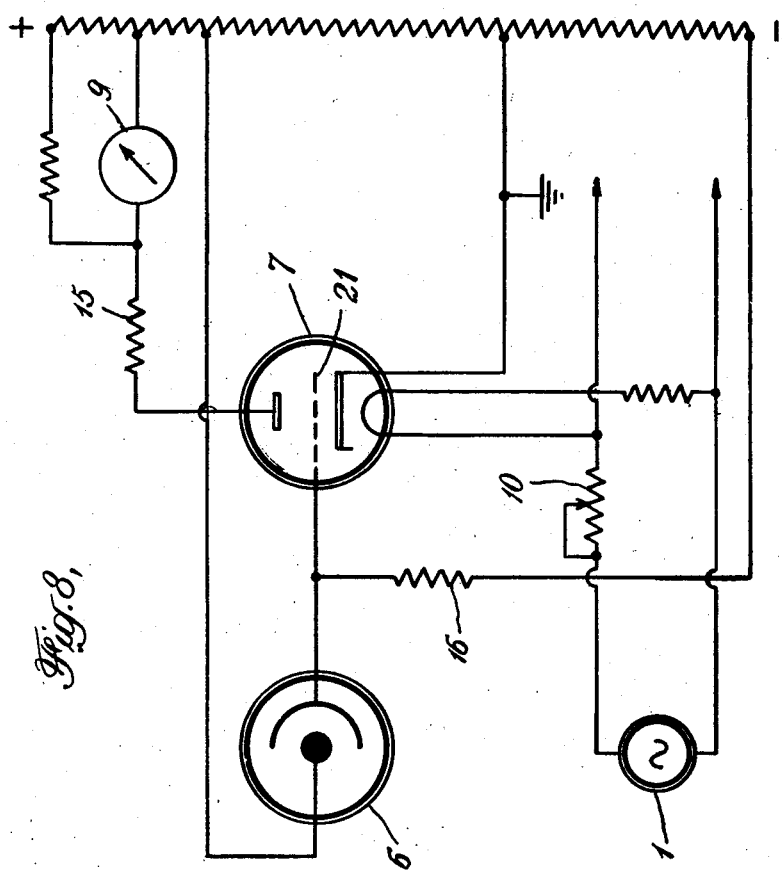

Patented Aug. 27, 1946

2,406,716

UNITED STATES PATENT OFFICE 2,406,716

DIRECT READING DENSITOMETER

Monroe H. Sweet, Binghamton, N. Y., assignor to General Aniline & Film Corporation, New York, N. Y., a corporation of Delaware Application July 29, 1942, Serial No. 452,697

5 Claims. (Cl. 88—14)

My invention relates to direct reading densitometers, particularly of the type for use in measuring the density of exposed and developed photographic films.

The principal object of my invention is to provide a densitometer which will give an objective, direct and accurate reading of the density of a material, such as a photographic film, in accordance with the light transmitted by such material.

Another object is to provide a densitometer in which the light transmitted by the material being measured is received by a photo-electric tube which is electrically connected to the grid of an electronic amplifier tube, operates such that the plate current (which controls the meter reading) is logarithmically related to the photo-tube current which, in turn, is linearly related to the light transmitted by the material. Thus, since density is the logarithm of the opacity, the resultant meter reading will give density directly.

A further object is the provision of a high value grid bias resistor in the electron tube circuit which results in correcting the response in the meter and plate circuit for high densities, thus making possible uniform scale graduations over the entire range of densities.

A further object is the provision of a densitometer having a reading head or tube which may be used selectively in fixed relation to a light source and meter or which is portable for remote use and for reading reflected light intensities.

Other objects and advantages will be apparent as the description proceeds, reference being had to the figures of the accompanying drawings forming a part of this application and in which like reference characters indicate like parts.

In the drawings:

Figure 1 is a perspective view of my densitometer, the parts being shown in unassembled relation and certain parts being broken away for clearness.

Figures 2 to 7 inclusive show three electronic circuits and their corresponding density-response curves which illustrate the theory of this invention.

Figure 8 shows the circuit used with my densitometer, and

Figures 9 and 10 show scale graduations illustrating the improvement of my invention.

The mechanical elements of my invention are few and simple. Referring to Figure 1, these elements include a light source 1, which may be a 15 candle power concentrated-filament auto head-lamp, receiving its current energy from any suitable regulated power supply designated at 2. The light rays from the lamp are focused by a single condenser lens 3.

A casing, preferably in the form of a tube 4, is provided with an aperture 5 through which the focused rays of lamp 1 may pass to a highly sensitive vacuum photo-tube 6, such as an R. C. A. "929" tube of the Sb-Cs coated type, suitably mounted within tube 4. The photo-tube 6 is connected—by an electronic circuit to be described— with an amplifier tube 7 of a conventional triode type, also suitably mounted in the tube 4. The current for the photo-tube 6 and amplifier tube 7 is provided through a cable connection 8 to the power supply 2. This cable may be of such length as alternatively to permit the tube 4 to be secured in relation to the light source 1 on the instrument support or panel P or be moved around as a portable "exploring" measuring head for use at points remote from the instrument. The photo-tube 6 is the type in which the electrical conductivity is a linear function of the amount of light incident on the photo-tube.

A meter 9, which may be a conventional D. C. moving coil type and of 1.0 ma. full scale sensitivity, is provided in the circuit, such meter being responsive to the output of the photo-tube amplifier tube combination to provide a direct objective density reading in a manner to be explained. A suitable current control 10 is provided in the light circuit to initially adjust the meter, in respect to the light intensity, to zero reading before the material to be measured is inserted between the light and the photo-tube.

If desired, the tube 4 may be swingably mounted on the instrument panel or support P by means of the hinge pintle 11, thus facilitating orientation of the material to be measured in relation to the lamp 1 and tube 4.

The material 12 to be measured for density is illustrated as a strip of photographic film, although it is apparent that this is illustrative only of a particular use for which my invention is especially adapted.

A suitable heat absorbing filter 13 is interposed between the lamp 1 and the material 12.

In my improved system of density measurement, the optical system may be described as a double-diffuse system since the material 12 is diffusely illuminated and the emergent light is diffusely received by the photo-tube 6.

The density of the material 12 is, of course, measured in terms of the light absorbed by the photo-tube 6 with the material interposed, in comparison with the light absorbed without the material. The full intensity of the light from the lamp 1 falls on the photo-tube 6 when zero density is read. Otherwise, the intensity is reduced by the material measured. The adjusting element 10 permits bringing the meter pointer to zero with the full intensity of the light on the photo-tube, to correct for possible color temperature or current changes.

Most direct-reading photoelectric instruments have used electrical circuits with essentially linear amplifier response to photo-tube output. If unmodified, this results in a badly cramped density scale—as illustrated at 14 in Figure 9. The uniformity of the scale of the barrier layer photocell microammeter systems can be improved by inserting a high series resistance in the circuit. However, this requires higher initial light intensities, and decreases the inherent stability of the circuit.

When using a vacuum photo-tube amplifier combination whose output characteristics are linear with respect to intensity, it is feasible to use an output meter having cut pole-pieces. While the improvement is quite helpful, it by no means gives a uniform density scale. Furthermore, cut pole-piece instruments are not evenly damped over their whole scale lengths. Consequently, meters of this type are under-damped or over-damped at some part of their scale.

These disadvantages are avoided in a photo-tube-amplifier combination with a logarithmic response such as is used in my invention.

The theory of my invention may be explained in reference to Figures 2 to 7 inclusive:

In the circuits shown in Figures 2, 4 and 6, the photo-tube 6 is connected directly to the grid 21 of the amplifier tube 7. Light falling on the photo-tube will increase its conductivity and thus cause it to conduct a grid current. The potential of the grid will tend to become positive. This gives rise to an increased plate circuit current which is measured on the output meter. The following relationships apply:

1. The light on the photo-tube is a linear (intensity) function of the transmission characteristic of the material to be measured for density.
2. The photo-tube conductivity and thus the photo-tube current is a linear function of the incident light.
3. The photo-tube current is identical with the grid current.
4. The grid potential is substantially a logarithmic function of the grid current.
5. The plate current is a linear function of the grid potential.

Density is defined as $D = \log 1/T$, where T is the light transmission factor of the material. Step No. 4 above introduces the logarithmic relationship necessary to give a uniformity graduated density scale on the output meter.

Figure 3 shows the relationship between the material density and plate current for the circuit of Figure 2. Obviously, it is not perfectly linear.

In the circuit of Figure 4, a plate resistor 15 has been added. The plate resistor or resistance 15 is of such value as to produce a uniform logarithmic relationship between the plate current and the grid current for plate current values sufficient to produce a substantial voltage drop across resistance 15 in comparison with the plate supply voltage to the thermionic amplifier tube 7. This greatly improves the portion of the curve corresponding to the lower densities of the material, as shown in Figure 5.

In the circuit of Figure 6, a very high-value grid bias resistor 16, of the order of 1,000 megohms impedance has been added. The impedance value of this resistor may, of course, vary, and I do not limit my invention to this particular value. The practical limits of resistance values within which this resistor may fall will be determined by the characteristics of the circuit in which it is placed. The effect of this high value grid bias resistor is to increase the cut-off value of the grid current of the amplifier tube, as represented by the broken line 22 in Figure 7. By choosing the resistance value correctly, and by applying the proper bias voltage, a linear toe can be obtained, as shown in Figure 7.

The grid resistor 16 serves to introduce a current into the grid circuit which opposes the photo-tube grid current. The magnitude of this "bucking" current is only of the order of 0.01 microampere. At a high density of, say 3.0, the photo-tube current is about 0.02 microampere, and the "bucking" current has an appreciable influence on the grid potential. At a density of 2.0, the photo-tube current is 0.20 microampere, and the effect of the "bucking" current is very small. For densities near zero, the photo-tube current is 20 microamperes, and the effects of the "bucking" current are negligible.

Hence, it is clear that this grid circuit arrangement operates in such a way as to affect the density vs. plate current curve only at high density values. The practical result of this is to make possible a relatively uniform meter scale such as that shown at 17 in Figure 10.

In Figure 8 is illustrated diagrammatically the circuit used in my improved densitometer and including the high value grid bias resistor 16 and the plate resistance 15.

When the measuring head or tube 4 is mechanically detached from the instrument, it is useful as an "exploring" element with which the intensity of light for small areas of a projected image may be measured. The logarithmic response of the circuit has a unique advantage in this application of the invention because it is the logarithm of the relative light-intensity in the plane of the printing paper that is important in projection printing.

Suitably mounted, the measuring tube 4 could be used in reflection densitometry. The advantages of the logarithmic circuit would apply to such use. The close approximation of linearity of logarithmic changes in light-intensity to changes in specimen density, together with the high speed of response of the circuit and the relatively high (1.0 ma.) output, render the circuit adaptable for incorporation in the design of recording densitometers. It is especially valuable where continuous-tone densitometer strips are to be automatically measured and recorded.

I have also found that this instrument can be used very effectively for abridged spectophotometry. This is accomplished by inserting suitable optical filters, such as shown at 18 in Figure 1, the light beam and adjusting, at 10, the light source intensity to give an initial meter output reading of 0.0 density for each filter used. With a single photo-tube, such as an R. C. A. 929, a spectral range of 270–620 millimicrons can be covered.

The scale 17 of the meter 9 is empirically calibrated in density units for direct reading.

In the practical use of the densitometer for measuring, for instance, the density of a photographic film, the power supply is turned on, the intensity of light 1 adjusted at 10 to give a 0.0 reading on the meter 9. The film 12 is then inserted between the light 1 and the aperture 5 in the tube 4 (in line with the llgiht). The density of the film where the light is transmitted therethrough can be read directly on the scale 17 of the meter.

Although I have described my invention in connection with certain practical forms and uses therefor, it is to be understood that these are intended as illustrative only and not inclusive, as obviously the invention is of broader application. I do not limit myself, therefore, other than by the appended claims.

I claim:

1. In a direct reading densitometer, a light source, a vacuum photo-tube for receiving light from said source through material, the density of which is to be measured, a thermionic amplifier tube and means for supplying plate voltage thereto, the said amplifier tube being of such construction that plate current therein bears a generally logarithmic relationship to its grid current, said tube having its control grid connected with the cathode of the said photo-tube, a grid resistor of such value and bias as to effect substantially uniform response of plate current to uniform changes in the logarithmic value of the light incident upon the photo-tube for values of incident light such that the grid resistor current is an appreciable fraction of the photo-tube current, and a meter having a uniformly graduated scale of density values responsively connected with the plate output of the said thermionic amplifier tube.

2. In a direct reading densitometer, a light source, a vacuum photo-tube for receiving light from said source through material, the density of which is to be measured, a thermionic amplifier tube and means for supplying plate voltage thereto the said amplifier tube being of such construction that plate current therein bears a generally logarithmic relationship to its grid current, said tube having its control grid connected with the cathode of said photo-tube, a meter having a uniformly graduated scale of density values responsively connected with the plate circuit, a grid resistor of such value and bias as to effect substantially uniform response of plate current to uniform changes in the logarithmic value of the light incident upon the photo-tube for values of incident light such that the grid resistor current is an appreciable fraction of the photo-tube current, and a resistance in the plate circuit of such value as to effect a substantially uniform response of plate current to uniform changes in the logarithmic value of light incident upon the photo-tube for values of incident light which cause plate current values sufficient to produce a substantial voltage drop across said resistance in comparison with the plate supply voltage to the thermionic amplifier tube.

3. In a direct reading densitometer, a light source, a vacuum photo-tube for receiving light from said source through material, the density of which is to be measured, a thermionic amplifier tube and means for supplying plate voltage thereto the said amplifier tube being of such construction that plate current therein bears a generally logarithmic relationship to its grid current, said tube having its control grid connected with the cathode of the said photo-tube, a meter having a uniformly graduated scale of density values responsively connected with the plate circuit, a power supply and a grid resistor of such value and bias as to effect substantially uniform response of plate current to uniform changes in logarithmic value of the light incident upon the photo-tube for values of incident light such that the grid resistor current is an appreciable fraction of the photo-tube current, an arm removably connected to a support and within which are enclosed the vacuum photo-tube, the amplifier tube and the connection between the cathode of the photo-tube and the grid of the amplifier tube, said arm also having an opening for admitting light to the photo-tube, and a plurality of electrical connections leading from said arm to the power supply and meter and of such length as to allow the arm to be removed from the support and used remotely therefrom.

4. In a direct reading densitometer, a light source, a vacuum photo-tube for receiving light from said source through material, the density of which is to be measured, a thermionic amplifier tube and means for supplying plate voltage thereto the said amplifier tube being of such construction that plate current therein bears a generally logarithmic relationship to its grid current, said tube having its control grid connected with the cathode of said photo-tube, a meter having a uniformly graduated scale of density values responsively connected with the plate circuit, a power supply and a resistance in the plate circuit of such value as to effect a substantially uniform response of plate current to uniform changes in the logarithmic value of light incident upon the photo-tube for values of incident light which cause plate current values sufficient to produce a substantial voltage drop across said resistance in comparison with the plate supply voltage to the thermionic amplifier tube, an arm removably connected to a support and within which are enclosed the vacuum photo-tube, the amplifier tube and the connection between the cathode of the photo-tube and the grid of the amplifier tube, said arm also having an opening for admitting light to the photo-tube, and a plurality of electrical connections, within one of which is the above-mentioned resistance, leading from said arm to the power supply and meter and of such length as to allow the arm to be removed from the support and to be used remotely with respect thereto.

5. In a direct reading densitometer, a light source, a vacuum photo-tube for receiving light from said source through material, the density of which is to be measured, a thermionic amplifier tube and means for supplying plate voltage thereto the said amplifier tube being of such construction that plate current therein bears a generally logarithmic relationship to its grid current, said tube having its control grid connected with the cathode of the said photo-tube, a meter having a uniformly graduated scale of density values responsively connected with the plate circuit, a power supply and a grid resistor of such value and bias as to effect substantially uniform response of plate current to uniform changes in the logarithmic value of the light incident upon the photo-tube for values of incident light such that the grid resistor current is an appreciable fraction of the photo-tube current, a resistance in the plate circuit of such value as to effect a substantially uniform response of plate current to uniform changes in the logarithmic value of light incident upon the photo-tube for values of incident light which cause plate current values sufficient to produce a substantial voltage drop across said resistance in comparison with the plate supply voltage to the thermionic amplifier tube, an arm removably connected to a support and within which are enclosed the vacuum photo-tube, the amplifier tube, the electrical connection between the cathode of the photo-tube and the grid of the amplifier tube and the above-mentioned grid resistor, said arm also having an opening for admitting light to the photo-tube, and a plurality of electrical connections leading from said arm to the power supply and meter and of such length as to allow the arm to be removed from the support and to be used remotely therefrom, one of said connections having as a part thereof the said resistance in the plate circuit.

MONROE H. SWEET.